(12) United States Patent
Sanders et al.

(10) Patent No.: US 8,244,222 B2
(45) Date of Patent: Aug. 14, 2012

(54) PROFESSIONAL TRANSLATION AND INTERPRETATION FACILITATOR SYSTEM AND METHOD

(76) Inventors: Stephen William Anthony Sanders, Tiburon, CA (US); Mateo Dylan Ward, Miami, FL (US); Steven Sikes, Miami, FL (US); Guillermo Alberto Medrano, Highland Mills, NY (US)

( * ) Notice: Subject to any disclaimer, the term of this patent is extended or adjusted under 35 U.S.C. 154(b) by 508 days.

(21) Appl. No.: 10/908,207

(22) Filed: May 2, 2005

(65) Prior Publication Data

US 2006/0259307 A1    Nov. 16, 2006

(51) Int. Cl.
*H04M 3/42* (2006.01)
*H04M 1/64* (2006.01)
*H04M 3/00* (2006.01)
*G06F 17/20* (2006.01)

(52) U.S. Cl. .. 455/414.1; 704/8; 379/88.05; 379/265.12

(58) Field of Classification Search ................ 455/414.1
See application file for complete search history.

(56) References Cited

U.S. PATENT DOCUMENTS

| | | | |
|---|---|---|---|
| 5,392,343 A * | 2/1995 | Davitt et al. ............. | 379/265.12 |
| 5,546,304 A | 8/1996 | Marschner et al. | |
| 5,870,454 A * | 2/1999 | Dahlen ...................... | 379/88.14 |
| 6,266,642 B1 | 7/2001 | Franz et al. | |
| 6,438,515 B1 * | 8/2002 | Crawford et al. .................. | 704/5 |
| 6,622,123 B1 | 9/2003 | Chanod et al. | |
| H2098 H | 3/2004 | Morin | |
| 2002/0169592 A1 * | 11/2002 | Aityan .............................. | 704/2 |
| 2003/0144895 A1 * | 7/2003 | Aksu et al. ........................ | 705/9 |
| 2005/0203727 A1 * | 9/2005 | Heiner et al. ..................... | 704/2 |
| 2005/0216252 A1 * | 9/2005 | Schoenbach et al. ............. | 704/3 |
| 2006/0122850 A1 | 6/2006 | Ward et al. | |
| 2006/0122903 A1 | 6/2006 | Medrano et al. | |

* cited by examiner

*Primary Examiner* — Nick Corsaro
*Assistant Examiner* — Joel Ajayi

(57) ABSTRACT

A system and method for providing real-time interpretation, translation, and cross-culture communication expertise for delivery over the global communication and wireless networks, mobile communication devices and kiosks. The system provides an end-to-end global communication and interpretation service for users including registration, listing, profiling, matchmaking, authentication, scheduling, reservation, delivery, billing, feedback, archiving and rating components. Consumers engage the translation/interpretation services of certified language and knowledge experts after communicating their needs in their native language(s) or by selecting translators/interpreters based on profiling and availability. Thereinafter, the real-time event and/or knowledge transfer is delivered over the global communications networks, mobile phones, or kiosks. A method for providing a means for receiving and converting speech into text, then translating the "source" text into a plurality of "target" languages for delivery of translated text and/or speech. A system for implementing a fully-integrated customized global communication platform for enterprises and organizations.

27 Claims, 14 Drawing Sheets

PROFESSIONAL TRANSLATION AND INTERPRETATION FACILITATOR SYSTEM AND METHOD

FIELD OF THE INVENTION

The present invention is in the field of Global Communication Services, specifically a system and method to provide real-time, accurate, certified language interpretation and translation services and cross-cultural expertise on-demand for individuals and organizations delivered over the global communications and wireless networks via mobile communication devices, kiosks and computers.

BACKGROUND OF THE INVENTION

Cross-cultural communication and global communication, wherein there exists personal and professional interaction between parties who speak different languages and/or come from different cultures, present greater challenges for individuals and organizations. The communication channels are expanding with advances in electronic and wireless data transmission, the rapid expansion of the global communications networks, the accelerated adoption of mobile applications and real-time global network delivery tools. With the growth of the on-demand information society, globalization, increased international travel, and surges in immigration worldwide, there exits a concomitant greater need to bridge these global communication channels by utilizing innovative communication platforms to exchange instant information in an appropriate cultural context and to facilitate and enhance real-time communication when parties speak different languages and come from other cultures.

In a society that is more mobile, omni-connected, and info-customer-centric, parties expect to find real-time solutions when communication problems, namely foreign language and cross-culture barriers, arise. The convergence of computing, communication and real-time technologies have created a global economy with an entirely new set of rules, opportunities and challenges. Cross-cultural experts and certified interpreters and translators currently offer their services on a per-assignment basis or are contracted by third-party groups to fulfill the needs of clients. A real time-global communication platform, with a database of rated providers, matchmaking tools, and scheduling components, will better serve individuals and organizations that demand more personalized attention, faster delivery of service, and more precise solutions. A system with an extensive database of providers, subject matter experts, real-time communication technology and digital collaboration tools will help people achieve goals in a situation and/or environment where language and culture barriers exist.

The global communications networks have created the backbone to provide real-time, on-demand, professional translation services; moreover, the burgeoning growth of international business, the borderless marketplace and the increased spatial division of labor have created a greater demand for professional global communication services, namely translation, interpretation and cross-cultural guidance. With an accelerating economy and a greater emphasis on customer-centric technologies, more consumers and organizations will participate in real-time global communication services and interact with multi-lingual knowledge experts to receive fast and personalized language translation solutions, information and guidance. Consumers and organizations will engage the skills and services of multi-lingual, knowledge experts—just-in-time, anytime, anywhere.

Globalization and mass emigration are creating greater interaction of persons from more racially, ethnically, and culturally diverse groups, contributing to linguistic and cultural barriers for adequate communication in critical fields, particularly in areas such as healthcare where communication errors can result in clinical, economic, and legal problems. With the advent of remote medical care, in which physicians make diagnoses via the global computer networks from locations worldwide, language and culture support will facilitate forging successful medical personnel-foreign language patient relationships. A system, method, device, apparatus, or a combination thereof will help find crucial information about foreign language patients in the global healthcare arena. Hospital providers worldwide tending to foreign language patients, emergency medical personnel trying to communicate with victims or individuals requiring critical care, educational institutes providing comprehensive medical treatment to its foreign student population, NGOs, including Red Cross, Doctors Without Borders, Operation Smile, as well as Military and government personnel operating beyond national borders, will embrace a system for facilitating communication between individuals requiring medical attention and healthcare providers.

Moreover, a customized real-time translation system for enterprises will help support the needs of its multilingual customer base. A fully-integrated, real-time interactive platform customized to an organization's specific needs will help organizations develop long-term relationships with its customers. Customized language and culture platforms for enterprises will facilitate communication within globally diverse workforces. Enterprises worldwide are seeking more innovative and efficient ways to deliver real-time solutions for their geographically dispersed workforces and for those that may face communication barriers during international assignments.

Current and emerging technologies are transforming the global communication channels. Broadband, optical networks, wireless LANs, real-time delivery tools, architecture endowed with intelligence, the advent of the Internet 2, and speech understanding computation combined with speech recognition tools will enable instantaneous network connectivity and will facilitate communication when parties need to exchange information, interact, and collaborate within environments that present language and culture challenges. The convergence of provider expertise, broadband and real-time delivery of knowledge, and digital customized platforms will facilitate communication and translation "just-in-time" and accommodate preferences "just-for-you."

In addition, because of the accelerated demand for instant communication without barriers, the increased real-time interaction of individuals via messaging and global communication technology, the increased amount of International travel and the spread of the global spatial division of labor, multinational companies such as eBay, Yahoo, Google, Microsoft, HP, Verizon, AT&T/Cingular, Apple Computer, Siemens, General Electric, Oracle, Sony, Nokia, Motorola, Virgin Atlantic, Ericsson, Lucent, British Telecom, SBC, Bell South, Samsung, American Express, Vodafone, France Telecom, Deutsche Telekom, as well as firms and organizations in healthcare, law and government, must meet the needs of customers and clients that are becoming more multicultural and multinational.

Heretofore, inventors have created and developed methods and processes for facilitating the delivery of network and telecommunication-based language translation and interpretation services. U.S. Pat. No. 5,875,422 (Eslambolchi, et al., —1999), expressly incorporated herein by reference, relates to an automatic language translation technique for use in a telecommunications network and provides a interpreter for telephone conversations that take place between people who speak different languages; yet, the technique is accessible via only an operator and a telephone, and not via a computer screen or kiosk; moreover, it provides no prior scheduling component, involves no subject matter expertise, lacks provider profiling, involves no one-button set-up or connection to translators as does this invention, and provides no tracking or archiving of data, session or event record.

U.S. Pat. No. 5,392,343 (Davit, et al., 1995), expressly incorporated herein by reference, relates to an on-demand language interpretation in a telecommunications system; but it provides only translators or interpreters to connect the two calling parties and not an integrated real-time global communication facilitation system to provide immediate assistance for overcoming language and culture barriers as well as subject matter expertise.

U.S. Pat. No. 5,870,454 (Dahlen, 1999), expressly incorporated herein by reference, relates to a telecommunications speech/text conversion and message delivery system; yet it does not provide voice-to-voice translation and/or telecommunications speech/text conversion, followed by real-time translation and delivery of messages by providers to consumer.

U.S. Pat. No. 5,546,304 (Marschner, et al., 1996), expressly incorporated herein by reference, relates to a system, i.e., an arrangement wherein an administrator uses a translation database in real-time to administer a switching system. The invention does not delineate a system or method for facilitating real-time communication for parties in situations and environments wherein there exits language and culture barriers. In addition, there exists no menu-driven component wherein parties can make selections based on preferences and specific needs for conveying information, for example, during interactions with health care staff and foreign language speaking patients, or legal situations requiring the communication of precise and accurate information with non-native speakers.

U.S. Pat. No. 6,266,642 (Franz, et al, 2001), expressly incorporated herein by reference, relates to a method and process for providing spoken language translation; but it lacks a fully integrated real-time communication system for providers to delivery instant translations and knowledge expertise and a customized communication platform for enterprises to serve a multilingual customer base and a diverse global workforce.

U.S. Pat. No. 6,622,123 (Chanod, et al., 2003), expressly incorporated herein by reference, relates a method and system for processing language in a computer system, particularly, generating translated phrases and expressions. This system focuses on the automation of language translation, but it does not utilize a database of providers for real-time communication delivery.

U.S. Pat. No. H2,098 (Morin, et al., 2004), expressly incorporated herein by reference, relates a multilingual communications device for providing a predetermined set of medical questions to aid in diagnosing patients that do not speak the language of the doctor. This system focuses on the automation of language translation by storing "an ordered list" comprising phrases and does not employ any video related to showing anything other than selectable phrases as opposed to people and their respective expressions and mannerisms. Furthermore, it does not have a "common link" where someone with fluency in two or more languages may bridge a communication gap between a consumer and another party that does not speak said consumer's language. Said U.S. Pat. No. H2,098 (Morin, et al., 2004) further relies on a limited set of "pre-recorded audio translations" and "digital phrases stored" and when combining these limitations with a user and respondent that do not speak each other's language, and also where any possible communication passed between said user and respondent is processed through software and a limited number of stored phrases, then that makes this system extremely limited. Said U.S. Pat. No. H2,098 (Morin, et al., 2004) further does not lend itself to the complexities of human interaction and language translation, since the important need for communication and knowledge transfer is bound by software, and since user and respondent have no common language; therefore, making it a scripting tool and not a tool for real-time translation.

Accordingly, existing inventions describe methods and systems for delivering language translation applications and multi-lingual knowledge transfer that is created by computer translation, and systems that enable individuals to receive translated information by a non-expert, but there does not appear to be an invention that possesses all the features and components of our system and method for delivering real-time translation and interpretation services and cross-cultural expertise, by certified providers over the global communication and mobile networks, and customized communication enterprise platforms and kiosks. To summarize, the systems and methods of the existing inventions have one or more of these disadvantages:

Global communication and language translation services are computer generated, leaving them prone to grave errors due to the complexity of language;

Global communication and translation/interpretation services are not delivered in real-time;

Global Communication and translation/interpretation services are not provided by experts in respective fields such as, but not limited to, law, healthcare, hospitality, government, and international business.

Global Communication and translation/interpretation services are not currently delivered over mobile communication devices with a subscriber business model or pay now per-usage platform;

Global communication and translation/interpretation services, especially for spoken language translation, using voice and speech recognition technologies, often result in critical misunderstandings and misinterpretations;

Global Communication and translation/interpretation services by selected providers for delivery via telephony and mobile communication devices cannot be scheduled for just-in-time, anytime, anywhere delivery, without depending on a third-party operator/facilitator to connect consumers (s) with provider(s);

Global Communication and translation/interpretation services do not generate an audit trail, via a transcript recording, including audio and visual, of the event, session, and conference, which can be especially useful in the healthcare and legal fields;

Global Communication and translation/interpretation services, currently offered over the Global networks, do not enable individuals and organizations to choose their provider based on factors including, but not limited to expertise, gender, age, profile, availability, and ratings.

Technological advances, especially related to telephony, real-time delivery of content, speech, text and information over the global communication networks, and advanced translation tools utilizing speech recognition and artificial intelligence components, facilitate communication wherein language and culture barriers exist, but the complexity of language and factors related to culture and specialized knowledge require experts to bridge the communication divide anywhere, anytime, just-in-time.

Technology and machine translations cannot possibly replace the human element necessary in critical translation and communication, especially in the medical and legal fields. Even with a database of phrases built into a computerized system to accommodate basic communication between and among medical personnel and patients, grave and critical errors can often occur because of miscommunication, misinterpretation, or lack of culture awareness. Slang, sayings, idiomatic phrases, dialects, accents, regional differences, levels of education and other concerns make computer systems alone inadequate to translate language, and further demand the need for talented human translators to work in conjunction with technology over the Global Communication Networks to offer a true value-added translation and knowledge transfer service.

The key challenge our invention addresses is finding solutions for facilitating real-time global communication and making immediate accurate spoken language translations from a source language to a target language in a given situation and/or for a specific request. A real-time digital Rosetta stone utilizing a database of qualified protocol advisors, ambassadors, certified translators and interpreters, operating out of remote locations, delivering expertise over the global computer networks, mobile phones, and kiosks, bridges the global communication channels with collaboration, customization, innovation and convenience.

SUMMARY OF THE INVENTION

The present invention relates to a system and method for delivering real-time translation services to individuals and organizations over the Global Communications Networks via a digital platform with registration, listing, profiling, matchmaking, authentication, scheduling, reservation, delivery, billing, feedback, archiving and rating components.

It is another aim of the present invention to provide the instant dissemination of translated data, information and speech by experts who specialize in providing professional translation and interpretation services in several fields, including but not limited to, healthcare, law, education, international business, tourism, hospitality, and government, for delivery over the global communication networks.

It is yet another aim of the present invention to provide real-time global communication and translation services with registration, listing, profiling, matchmaking, authentication, scheduling, reservation, delivery, billing, feedback, archiving and rating components in a subscriber-based or pay-now, i.e., a per usage based, platforms.

Another aim of this system and method for global communication facilitation is to help individuals and organizations find the optimum provider for their specific needs.

It is still another aim of the invention to supply the archiving of audit trails for support, reinforcement, documentation, review and accountability purposes.

It is still another aim of the invention to supply the translation and knowledge transfer service over numerous technologies including but not limited to e-communication devices, mobile phones, computers, kiosks, computer displays, etc.

The system and method also includes search engine and matchmaking components to link a plurality of certified interpreters from an extensive database located on a global computer networks, with information, data, interpretation, audio, and video being delivered in real-time to assist and support a client base, including attorneys, physicians, and organizations for (SOS) speech on site emergency situation translation/interpretation assistance.

DETAILED DESCRIPTION OF THE PREFERRED EMBODIMENTS

Figure 1:
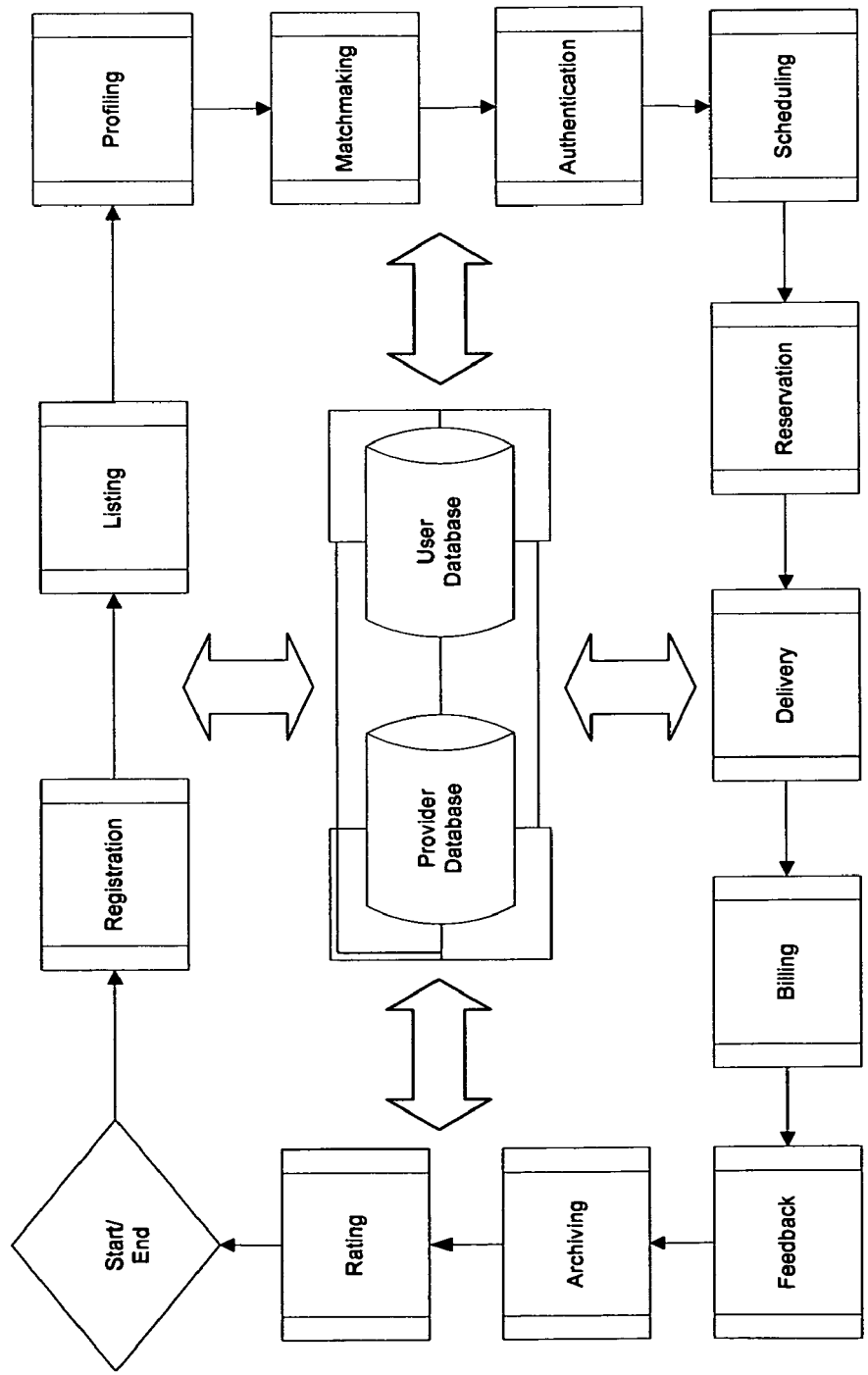
FIG. 1 is a flow chart depicting the summary process of the preferred embodiment

In a preferred embodiment of the present invention, a new type of translation/interpretation service, system and method is created that is vastly different than systems that exist today. The system and method of this invention involves a process and architecture that allows translation and knowledge providers to provide services to consumers via global communications networks with audio, video capabilities and archiving capabilities. These services of translation/interpretation and knowledge transfer can be hubbed and networked globally in a way that creates a virtual e-business hub to concentrate all translation/interpretation and knowledge transfer supply and demand into a consumer and provider interface system; thereby, greatly expanding the availability (geographical, skill set, and time schedule) of translation/interpretation services to both the mass consumer market and also to specialized fields, industries, enterprises, organizations, as well as academic and government sectors.

With a dramatic increase of the global communications networks, including but not limited to cellular phones, increased amounts of Internet lines, growth of flat screen displays, wireless internet, and more, it is only bandwidth restraints that would stand in the way out of a consumer receiving the knowledge transfer or translation/interpretation service from a service provider who could be located anywhere in the world. Moreover, the complexity of language does not lend itself well to computer-generated translation and therefore, it is this unique system and method that combines an educated, language proficient translator/interpreter and/or knowledge provider to provide a service over the global communications networks to a consumer.

Demand for knowledge transfer and translation/interpretation services varies greatly, in that consumers may be individuals in the mass market that are looking for an on-demand model for purchasing services; or consumers may be businesses that require specialized business services, such as a hospital that would need to be able to translate its intake and diagnosis's into many different languages.

Translation/interpretation and knowledge transfer services could easily be provided to a mass market consumer using an "on-demand" model for purchasing services. An example: A consumer listens to a voice mail message and the menu options include "press 9 for translation of this message" then the consumer selects the language and gets billed for the length of translation/interpretation time as a higher per minute fee than normal airtime, similar to a roaming fee. In said example, said consumer is able to press one button on a communication device, i.e., mobile phone, computer, PDA, and can be connected directly to a translator/interpreter. Another example occurs when individuals experience language/culture barriers while traveling in other countries. When these situations occur, these persons can dial the "global communication access number" for that country and get connected to an expert in either a call center or on their particular phone line (mobile or fixed line). Individuals may now converse with the translator/interpreter/communication facilitator in their native languages and then invite the local person into the call while the translator/interpreter communicates the message in the local language. Said consumer may connect to said expert directly without involvement from an operator or third-party. This "one-button" communication facilitator component enables individuals, traveling across borders either for business or pleasure, to go global by communicating locally. Moreover, the ability to use this "one-button" type of single action in order to receive said translator/interpreter services may be marked in a myriad of ways, including but not limited to, "I need to communicate in English", or in other ways that convey a need or desire to communicate in, or understand a language, in which any language can be specified.

Translation/interpretation and knowledge transfer services could easily be provided to a business consumer. An example: A business consumer has a need for translation/interpretation services and they connect directly to the system via computers or specialized devices linked into their corporate phone system so that information/translation can be accessed in either text, voice and/or video formats and the provider scheduling/availability component could be prescheduled in advance. Another example would be a hospital would need to be virtually certain that a translator would always be available in case of an emergency and the system could monitor provider availability using algorithms to ensure availability.

The invention would allow consumers to receive language translation and the knowledge transfer in a myriad of circumstances as long as they were connected to the global communications networks.

The preferred embodiment of the present invention will now be described in even greater detail by reference to FIGS. 1 through 14.

FIG. 1 depicts the overall process transaction flow starting with registration of the providers and consumers; listing; profiling; matchmaking; authentication; scheduling; reservation; delivery; billing; feedback; archiving; and rating.

Figure 2:
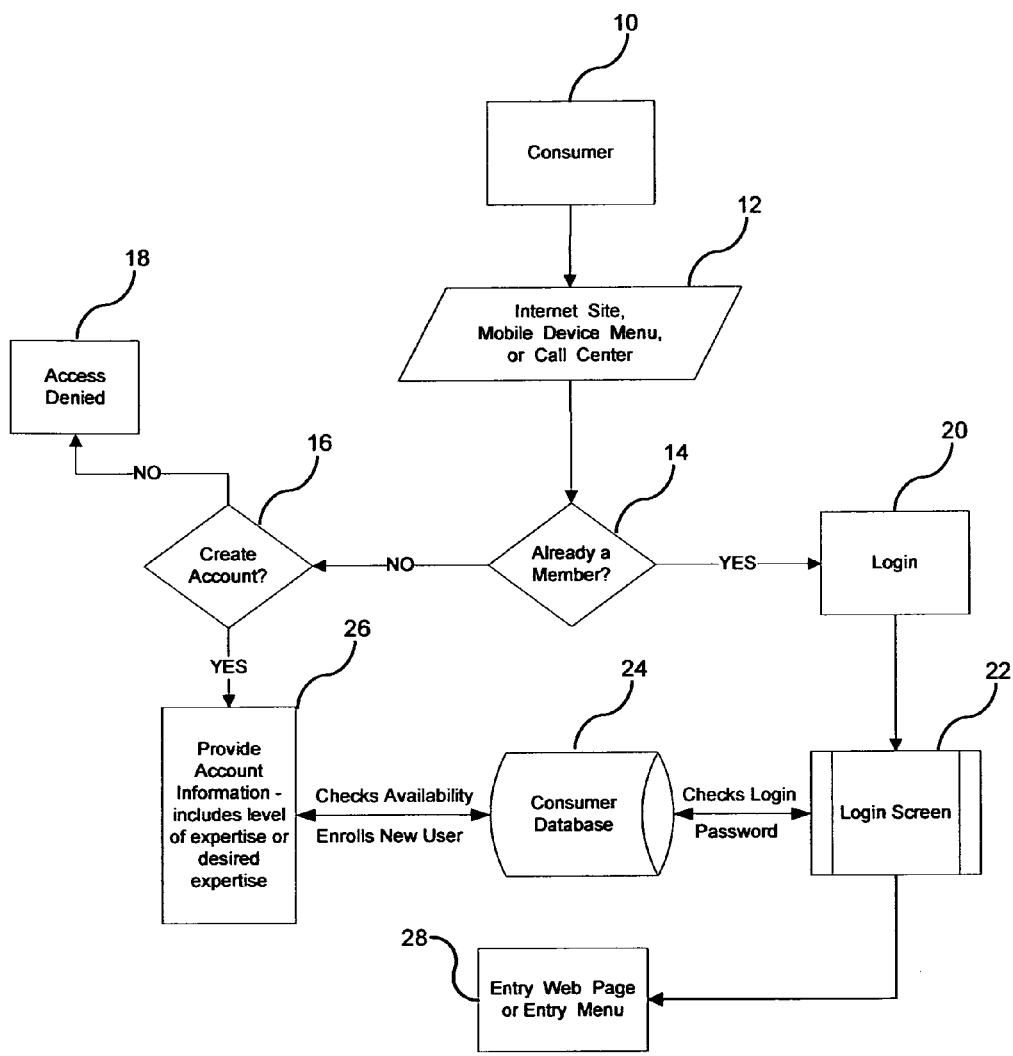
FIG. 2 is a flow chart depicting the consumer registration process of the preferred embodiment

FIG. 2 depicts the consumer registration process where a consumer 10 enters an Internet site, mobile device menu, or call center 12. If the consumer is not already a member then said consumer may decide to create an account 16. If an account is not successfully created access will be denied 18. If the consumer is already a member they will arrive at a login screen 22. Consumers that are not members that wish to create an account may be able to provide account information 26 and to successfully arrive at a login screen 22 after which the consumer may access entry web page or entry menu 28.

Figure 3:
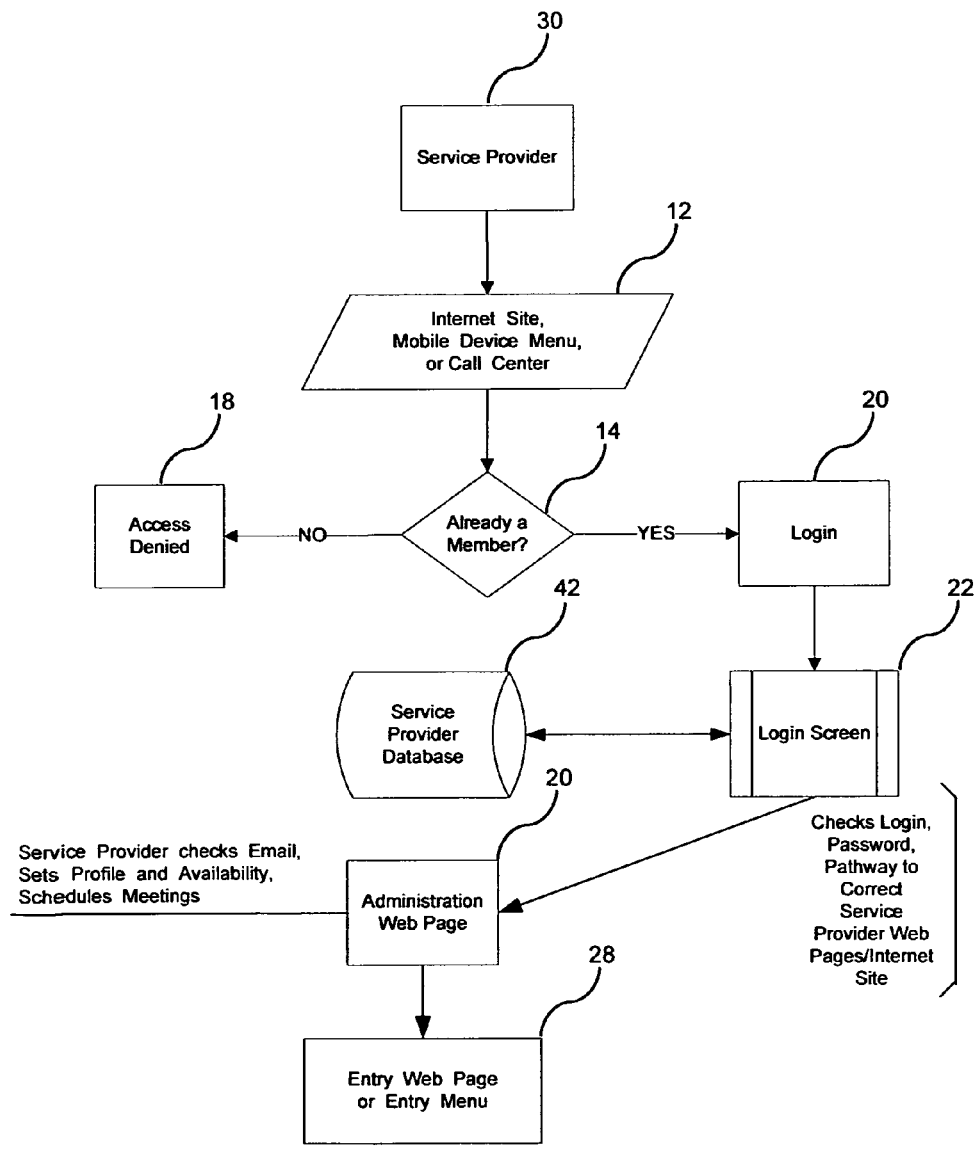
FIG. 3 is a flow chart depicting the provider registration process of the preferred embodiment

FIG. 3 depicts the provider registration process where a service provider 30 enters an Internet site, mobile device menu, or call center 12. If the service provider is not already a member then said service provider may be denied access 18. If said service provider is denied access then it may be possible for them to gain future access through interfaces including but not limited to an application process involving mailing, face-to-face interview or registration over the Internet. If a service provider is already a member 14 then said service provider will arrive at login 20 and then be transferred to a login screen 22. The login password of the service provider is verified by the service provider database 42 and once completed service provider will arrive at an administration web page 20 before arriving at an entry web page or entry menu 28.

Figure 4:
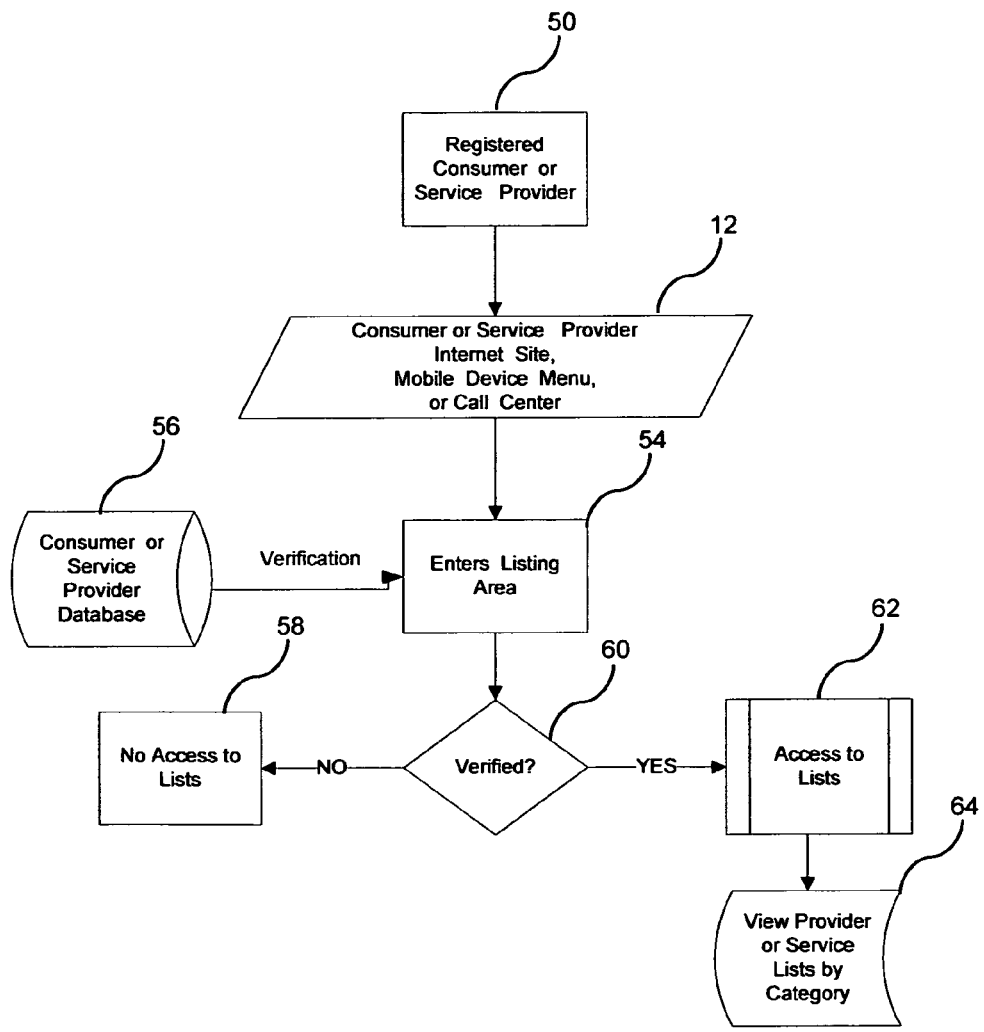
FIG. 4 is a flow chart depicting the listing process of the preferred embodiment

FIG. 4 depicts the listing process whereby a registered consumer or service provider 50 may enter the consumer or service provider Internet site, mobile device menu, or call center 12 before entering the listing area 54. Said registered consumer or service provider 50 must be verified 60. If verified, then access to lists 62 is provided and said registered consumer or service provider 50 may then view provider or service lists by category 64. If said registered consumer or service provider 50 is not verified, then no access to lists 58 is granted. Once said registered consumer or service provider 50 enters the listing area 54, verification against the consumer or service provider database 56 occurs.

Figure 5:
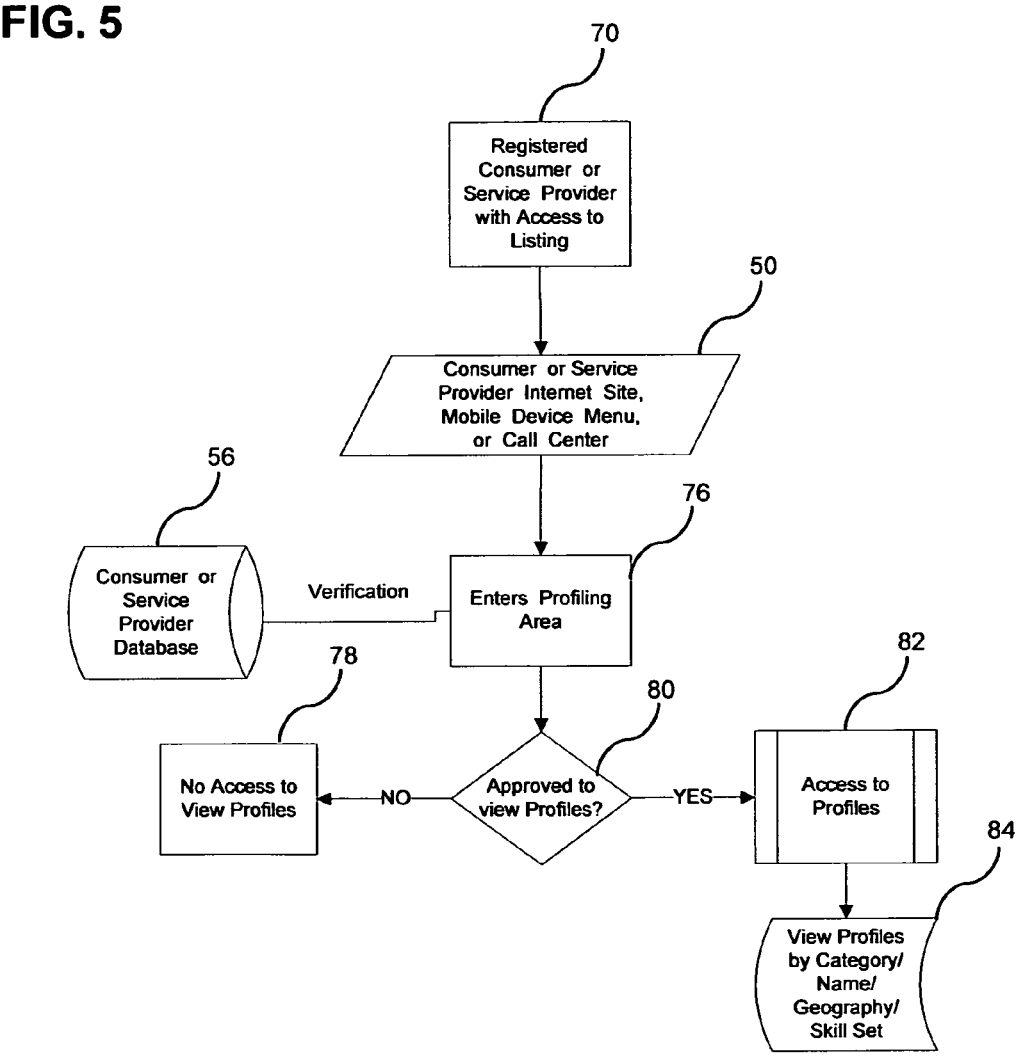
FIG. 5 is a flow chart depicting the profiling process of the preferred embodiment

FIG. 5 depicts the profiling process whereby the registered consumer or service provider with access to listing 70 enters the consumer or service provider Internet site, mobile device menu, or call center 50 and then thereby enters a profiling area 76 to be verified against the consumer or service provider database 56. At this point said registered consumer or service provider with access to listing 70 must be approved to view files 80, and if not approved then no access to view profiles 78 is granted. If said registered consumer or service provider with access to listing 70 is approved to view profiles 80 then access to profiles 82 is awarded and then said registered consumer or service provider with access to listing 70 may then view profiles by category/name/geography/skill set 84.

Figure 6:
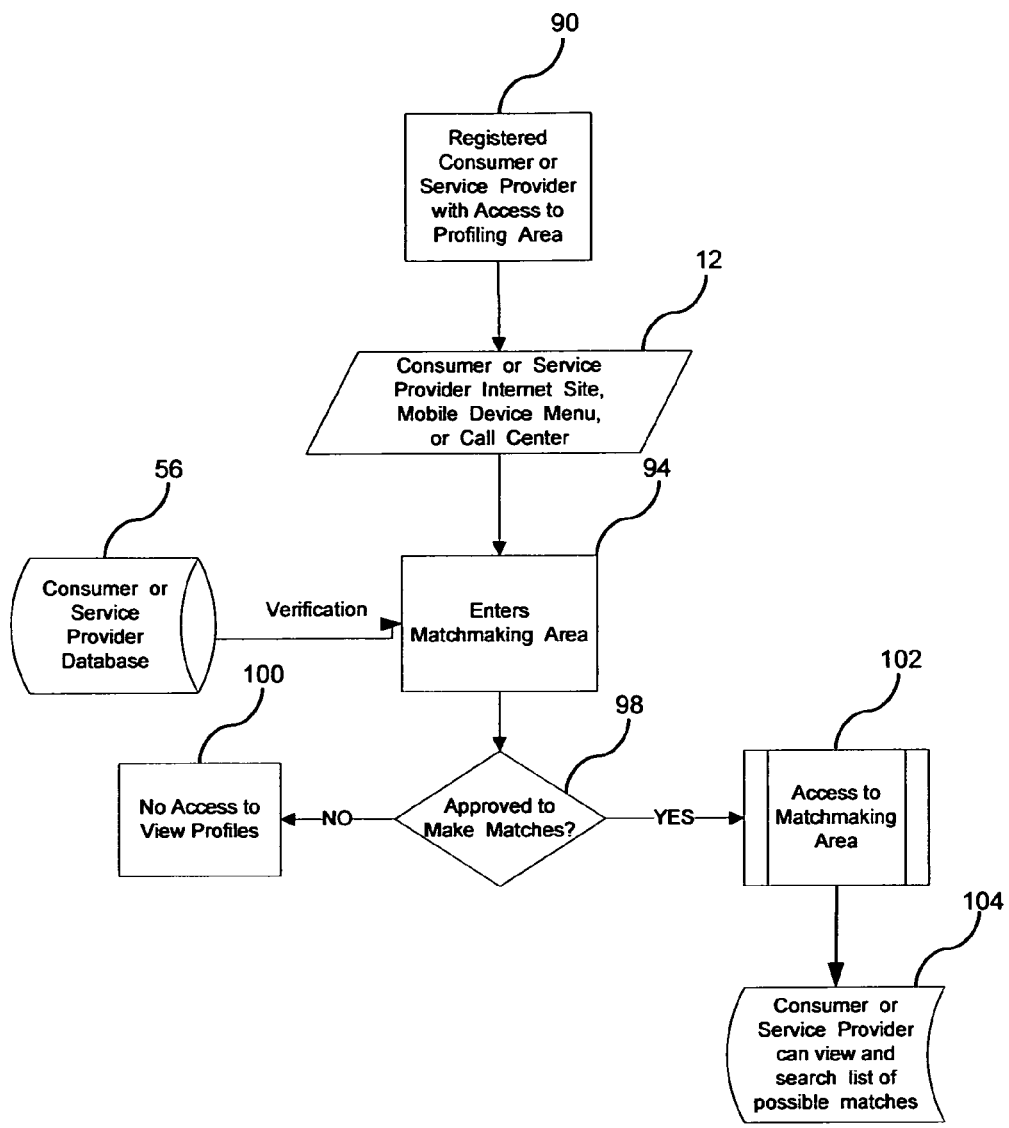
FIG. 6 is a flow chart depicting the matchmaking process of the preferred embodiment

FIG. 6 depicts the matchmaking process whereby a currently registered consumer or service provider with access to profiling area 90 enters the consumer or service provider Internet site, mobile device menu, or call center 12, and subsequently entering the matchmaking area 94 were said currently registered consumer or service provider with access to profiling area 90 is then verified against the consumer or service provider database 56. Post verification said currently registered consumer or service provider with access to profiling area 90 must be approved to make matches 98. If said currently registered consumer service provider with access to profiling area 90 is not approved then no access to view profiles 100 is granted. If said currently registered consumer or service provider with access to profiling area 90 is approved then access to matchmaking area 102 is granted, and thereby said consumer or service provider can view and search list of possible matches 104.

Figure 7:
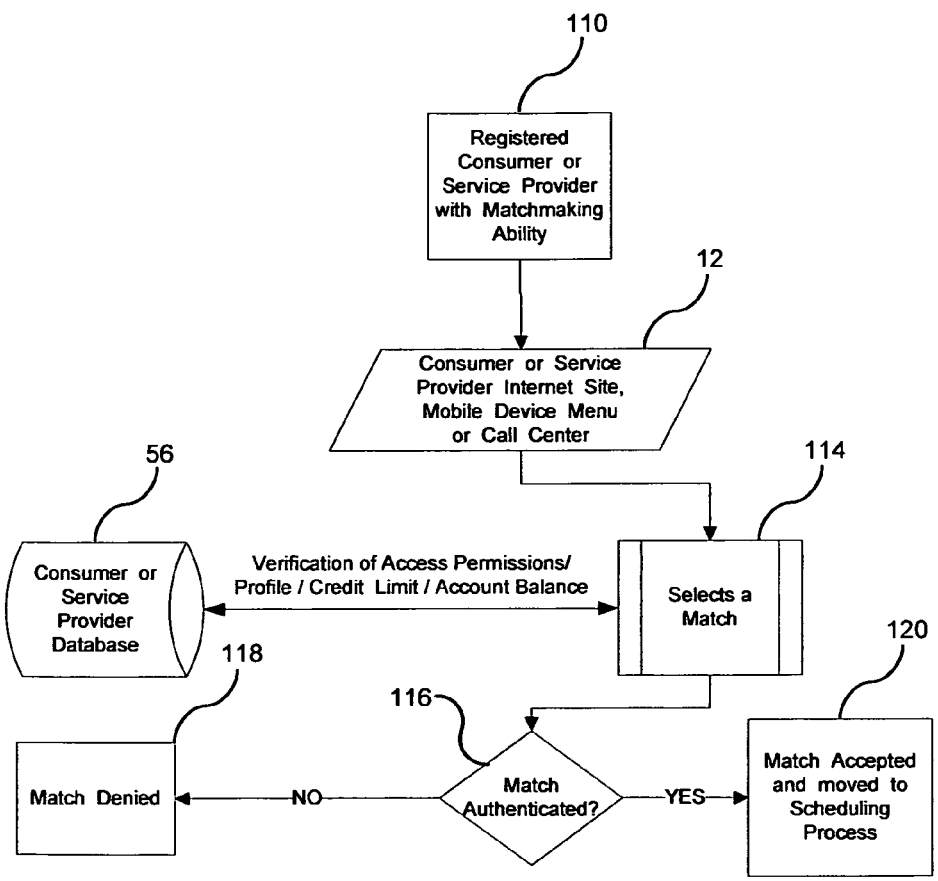
FIG. 7 is a flow chart depicting the authentication process of the preferred embodiment

FIG. 7 depicts the authentication process whereby a currently registered consumer or service provider with matchmaking ability 110 enters the consumer or service provider Internet site, mobile device menu or call center 12 and is prompted to select a match 114. At this time, verification of access permissions/profiles/credit limit/account balances are performed and matched against the consumer or service provider database 56. If a match is authenticated then said registered consumer or service provider with matchmaking ability 110 has match accepted and moves to the scheduling process 120. If a match is not authenticated then the match will be denied 118.

Figure 8:
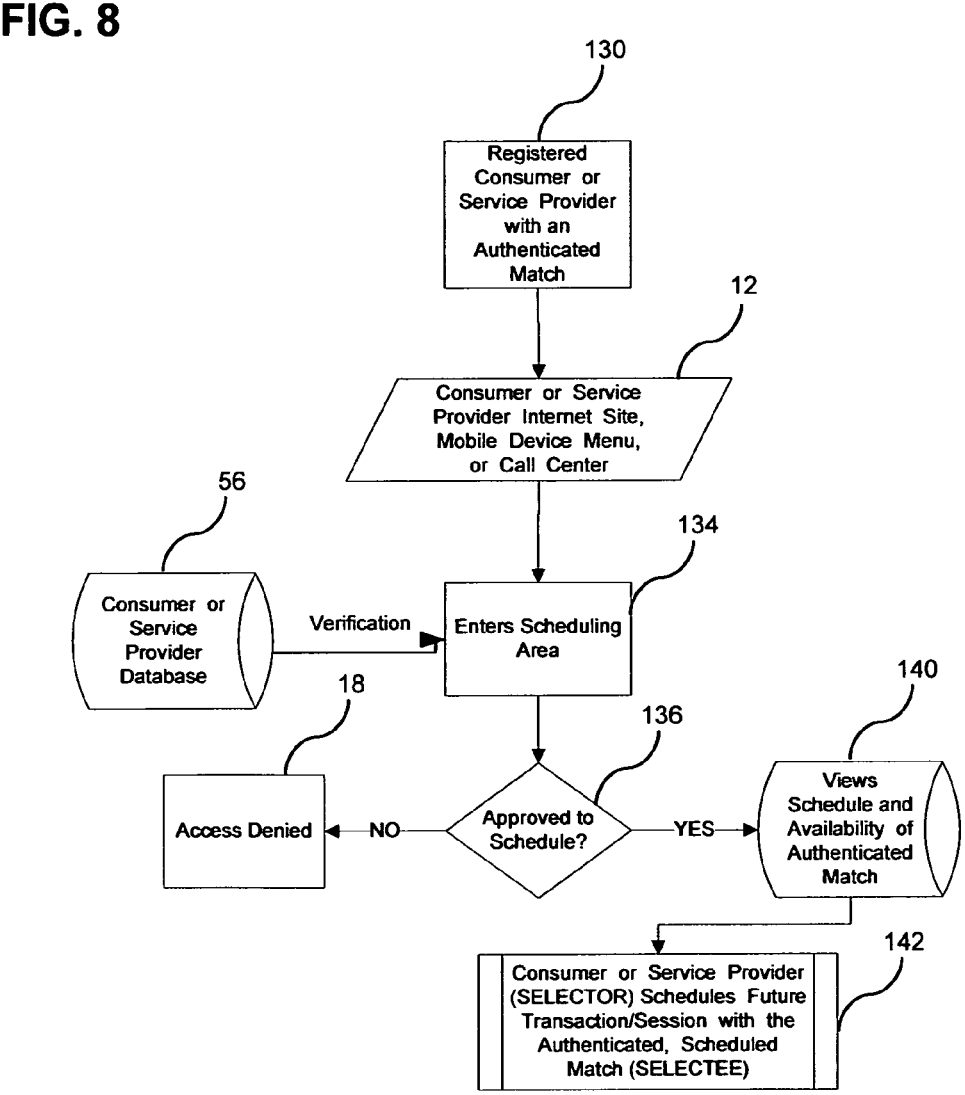
FIG. 8 is a flow chart depicting the scheduling process of the preferred embodiment

FIG. 8 depicts the scheduling process whereby a registered consumer or service provider with an authenticated match 130 enters a consumer or service provider Internet site, mobile device menu, or call center 12 then thereby enters the scheduling area 134, where verification against the consumer or service provider database 56 occurs. Said registered consumer or service provider with an authenticated match 130 must be approved to schedule, and if not approved, then access is denied 18. If said registered consumer or service provider with an authenticated match 130 is approved to schedule then they are able to use schedule and availability of authenticated match 140. At this point the consumer or service provider seeking the other party will be known as the SELECTOR and may schedule a future transaction/session with the authenticated scheduled match who will be known as the SELECTEE. Ultimately, consumer or service provider (SELECTOR) schedules future transaction/session with the authenticated, scheduled match (SELECTEE) 142.

Figure 9:
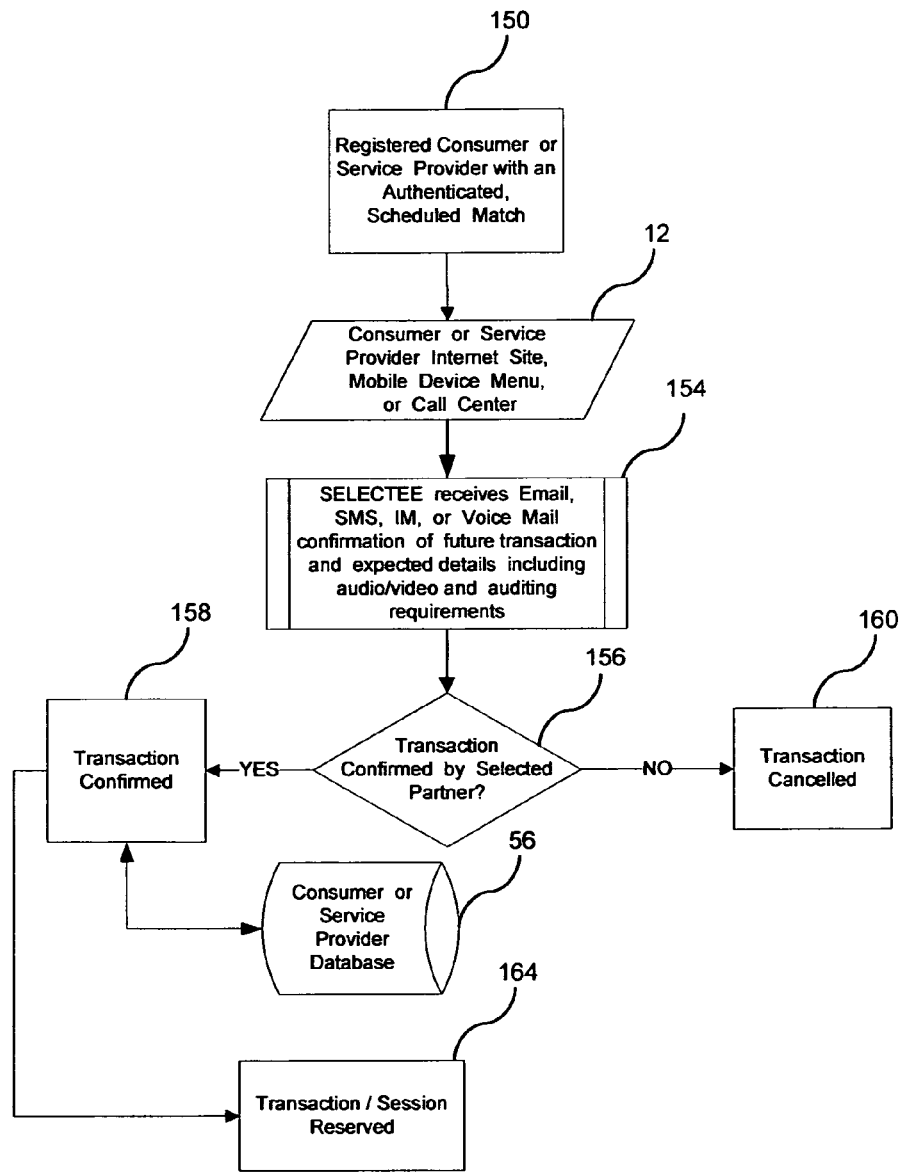
FIG. 9 is a flow chart depicting the reservation process of the preferred embodiment

FIG. 9 depicts the reservation process whereby a registered consumer or service provider with an authenticated, scheduled match 150 enters the consumer or service provider Internet site, mobile device menu or call center 12 and the SELECTEE, which is a consumer or service provider whose services are sought after by another called the SELECTOR, receives e-mail, SMS, IM, or voicemail confirmation of future transaction expected details including audio/video and auditing requirements 154. If the transaction is not confirmed by the selected partner, or SELECTEE, then the transaction is canceled 160. If the selected party, or SELECTEE, confirms the transaction 158, then the consumer or service provider database 56 is updated and the transaction/session is reserved 164.

Figure 10:
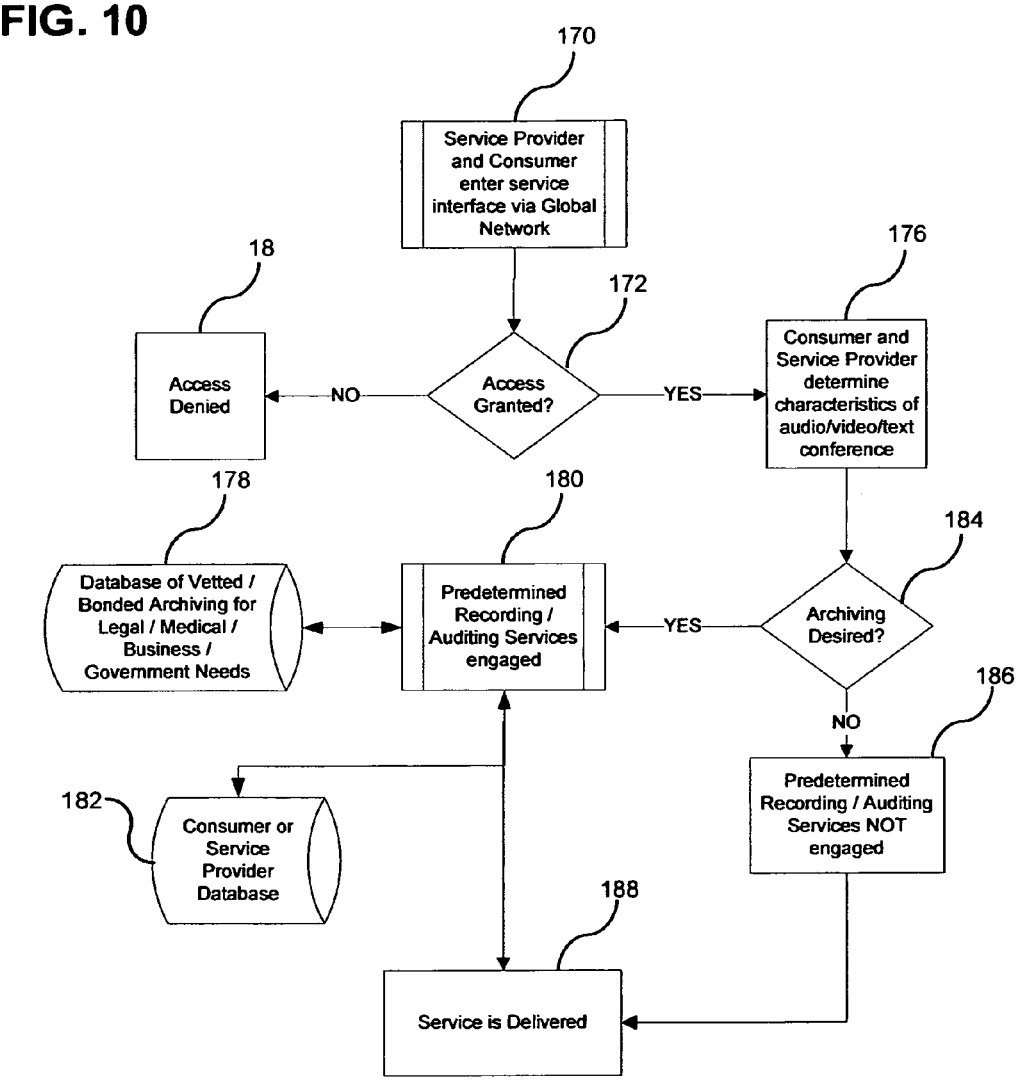
FIG. 10 is a flow chart depicting the delivery process of the preferred embodiment

FIG. 10 depicts the delivery process whereby a service provider and consumer enters service interface via global network 170. Access may or may not be granted, and if not then access is denied 18. If access is granted to said service provider and consumer, then said service provider and consumer determine characteristics of audio/video/text conference 176. Archiving may or may not be desired and if not then predetermined recording/audio services are not engaged 186, and then service is delivered 188, and the consumer or service provider database 182 is updated. If archiving is desired then predetermined recording/audio services are engaged 180 and the consumer or service provider database 182 is access and updated; whereby, an option to access a database of vetted/bonded archiving for legal/medical/business/government needs 178 may also occur, as well as another option interface to a third-party database. The delivery features of the invention depicted in FIG. 10 deliver provider services of language interpretation, cross cultural information, subject matter expertise across a plurality of media. Each consumer session can use a different Global Network 170 media including but not limited to telephony, internet modalities, video conference, speech to text, or text to speech. Once access is granted 172 the consumer and provider select the communication media, the archiving requirement, and any third party involvement 176. In one example of the invention, consumers will be presubscribed to a specific media. In another example of the invention, a consumer will have an ad hoc and spontaneous need for a media, which may or may not be different from said consumers predetermined media. In other examples of the invention, consumers will not have to be presubscribed to any media. The invention then evaluates the archiving decision made by the consumer and provider 176 and if needed invokes chosen prerecording or auditing services 186. In one example of the invention, the consumer and provider may have chosen to have the information exchange audited and recorded. In another, the consumer and provider may have chose to have the contents of the legal documents translated audited and notarized. In yet another example of the current invention, the consumer and provider have chosen to involve a third party to help the consumer apply the subject matter that the provider services detailed. Once the logistical support of archiving, auditing, and third party involvement is provisioned, the actual information exchange 188 begins. In one example of the current invention, the information exchange 188 involves unarchived, unaudited language interpretation for directions involving a third party limousine driver for a consumer in a foreign land via telephone. In another example of the current invention, the information exchange involves archived translation of cerebral surgical technology presented in video conference. In yet another example, the information exchange involves an archived audited and notarized translation of property deeds transmitted over internet protocols.

Figure 11:
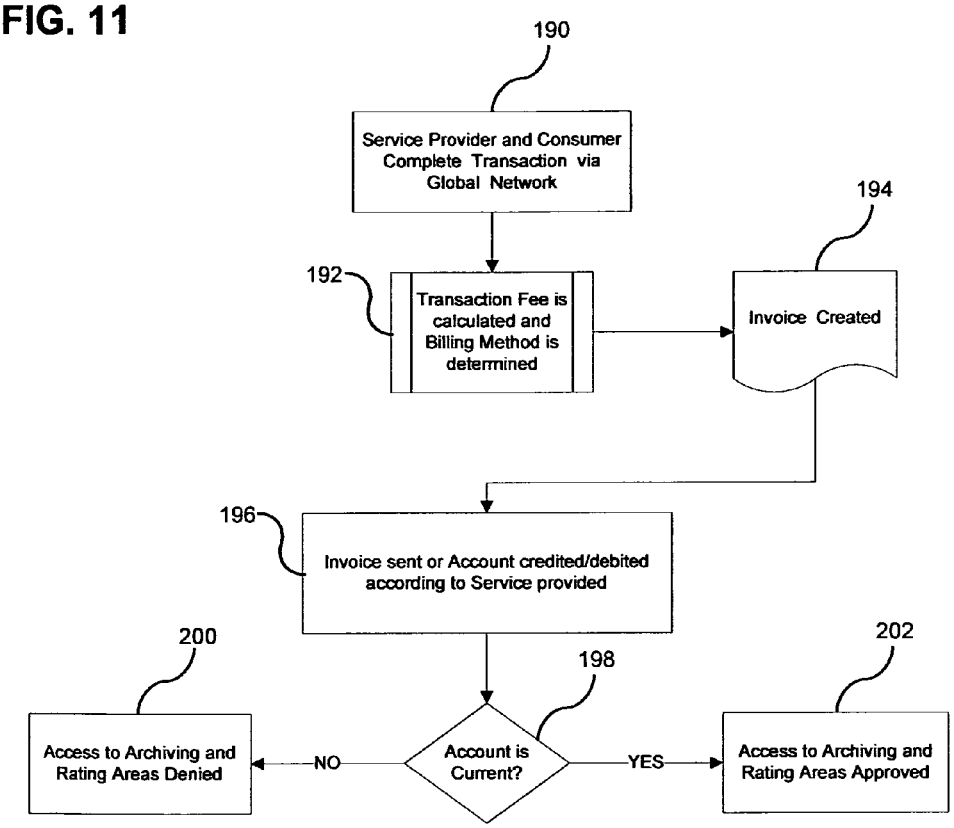
FIG. 11 is a flow chart depicting the billing process of the preferred embodiment

FIG. 11 depicts the billing process whereby a service provider and consumer complete transaction via global network 190 and the transaction fee is calculated and billing method is determined 192, thereby creating an invoice 194. Said it invoice 194 is sent or the account is credited/debited according to the service provided 196. If the account is not current then access to archiving and rating areas are denied 200. If the account is current then access to archiving and rating areas is approved 202.

Figure 12:
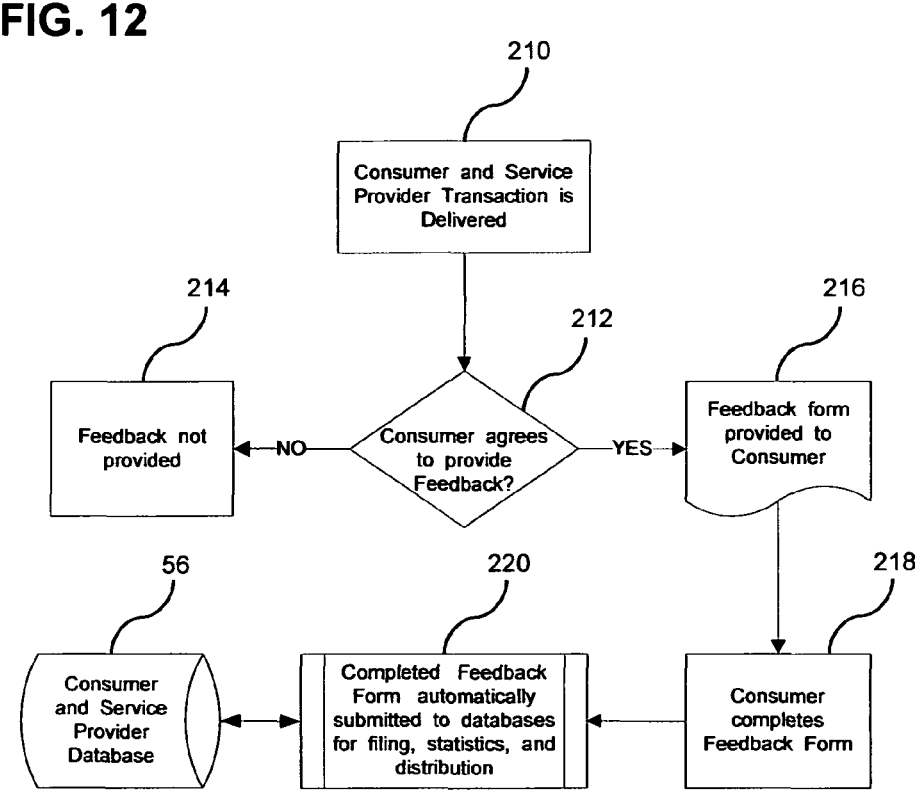
FIG. 12 is a flow chart depicting the feedback process of the preferred embodiment

FIG. 12 depicts the feedback process whereby a consumer and service provider transaction is delivered 210. If said consumer does not agree to provide feedback then feedback is not provided 214. If said consumer agrees to provide feedback than feedback form is provided 216 and said consumer completes feedback form 218. Once said consumer has completed feedback form then completed feedback form automatically is submitted to databases for filing, statistics and distribution 220 and consumer and service provider database 56 is accessed and updated.

Figure 13:
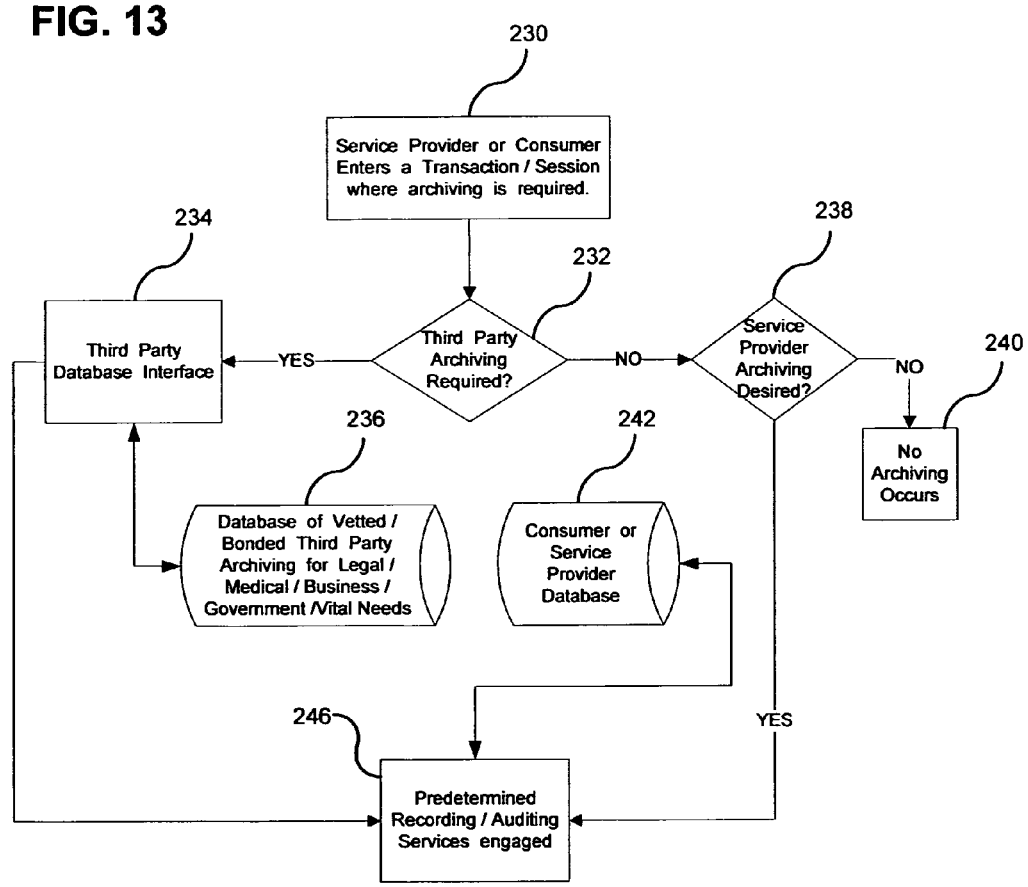
FIG. 13 is a flow chart depicting the archiving process of the preferred embodiment

FIG. 13 depicts the archiving process whereby a service provider or consumer enters a transaction/session where archiving is required 230. If a third-party archiving is not required, and then service provider archiving is also not required then no archiving occurs 240. It no third-party archiving is required; however, service provider archiving is desired then the predetermined recording/auditing services are engaged 246 and the consumer or service provider database 242 is accessed and updated. If third-party archiving is required then a third-party database interface 234 will access and update a database of vetted/bonded third-party archiving for legal/medical/business/government/vital needs 236, and then predetermined recording/auditing services are engaged 246.

Figure 14:
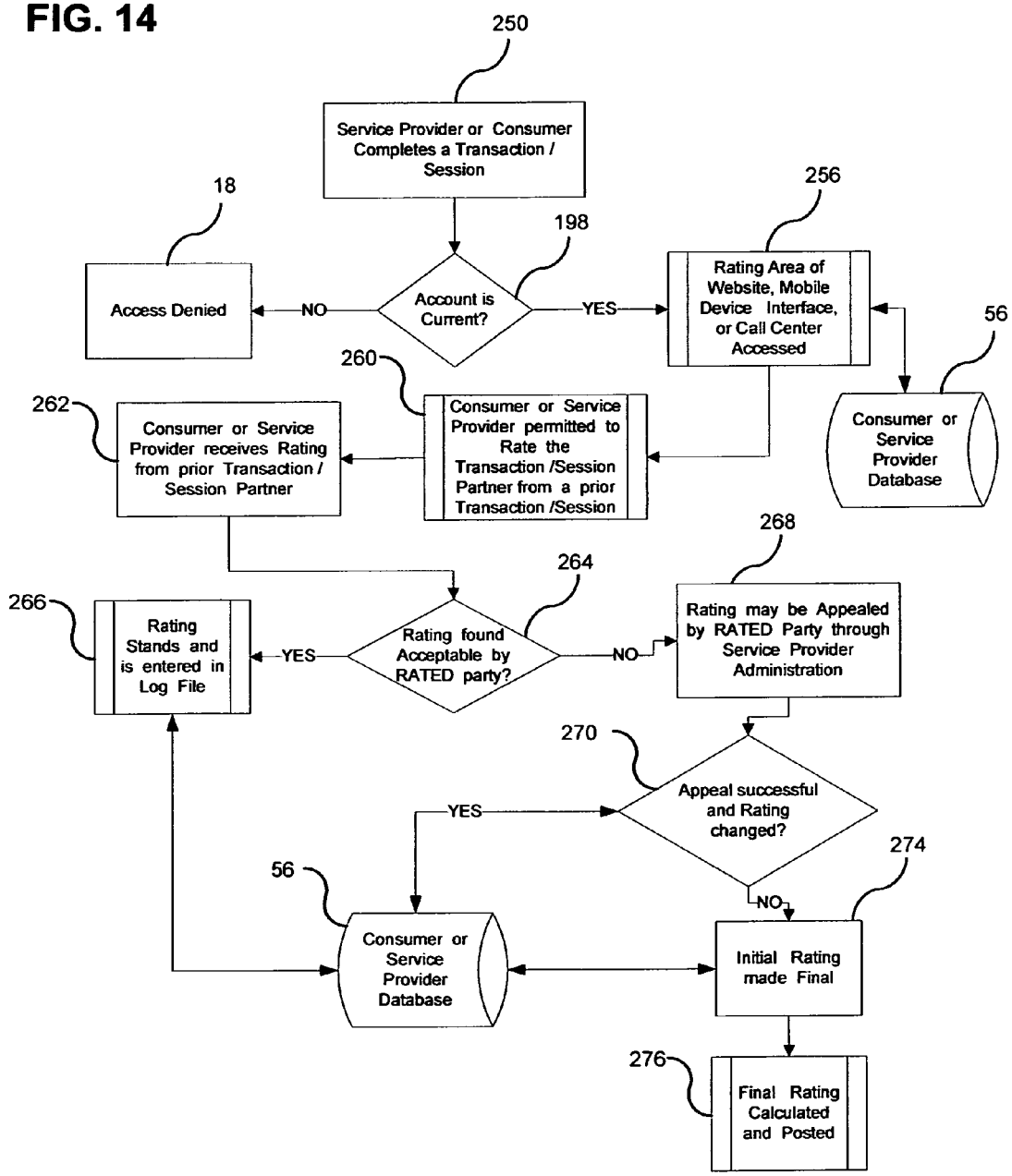
FIG. 14 is a flow chart depicting the rating process of the preferred embodiment

FIG. 14 depicts the rating process whereby a service provider or consumer completes a transaction/session 250. If the account is not current then access is denied 18. If the account is current then the rating area of web site mobile device interface for call-center is accessed 256, and the consumer or service provider database 56 is accessed and updated. At this point said consumer or service provider is permitted to rate the transaction/session partner from a prioress transaction/session 260 and a service provider may receive a rating from a prior transaction/session partner 262. If said rating is found acceptable by the rated party than the rating stands in this entered into the log file 266, and said consumer or service provider database 56 is accessed and updated. If said rating is not found acceptable by the rated party than said rating may be appealed by rated party through service provider administration 268. If said appeal is successful and rating is to be changed, then said consumer or service provider database 56 is accessed, and the new rating stands and is entered in log file 266. If said appeal is not successful and rating is not changed then initial rating is made final 274, and then final rating is calculated and posted 276.

What is claimed is:

1. A method in a data processing system for matching end users with providers of translation and interpretation services, based on a plurality of factors, predefined or preset by the end users, comprising the steps of:
    receiving an end user request for translation or interpretation services over an Internet-enabled global communications network or mobile and wireless network;
    defining a data set consisting of information from the group of: native language, dialect, culture, location, gender, age, education level, availability, rating range, experience, reviews, subject matter expertise, the desired need, including but not limited to medical, business, academic, legal, and personal reasons; with said data sets aggregated and implemented into an algorithm for the end users' personalized needs, for particular events, sessions, episodes, meetings, procedures, or interactions;
    determining which of the plurality of profiles matches the requests, in order of sequence, based on the priority and metric pre-assigned value level defined as information matching said end user request consisting of the group of: languages, location, subject matter expertise, culture, gender; and that is concomitant with the data sets and criteria;
    providing a list of matching profiles to the end user;
    receiving a selection of the matching profiles for the end user(s);
    receiving a selection from a plurality of matching provider profiles predefined by the end user(s); or using fewer data sets to initiate a quick match in the event of time restrictions or an urgent need or event requiring immediate attention or care;
    filtering, namely reducing the number of data sets, and curating, namely monitoring and reviewing, the plurality of provider profiles by selected end users' specific preferential and essential data sets within the plurality of provider profiles, especially if any providers update their profiles, including but not limited to locations and skill sets;
    notifying the matching providers, in order of compatibility based on the desired attributes and skills, and the requested needs and the degree of urgency required to provide translation or interpretation services for said end user(s);
    messaging to end user(s) alerting them of available translation and interpretation providers, based on predefined criteria, need, or situation;
    selecting the provider and submitting a time and date, including time zones from a drop-down menu, for a real-time session;
    confirmation by both parties, namely the end users and the providers, to participate in a real-time interaction and session; and
    transmission of an invite, with details and specifics, via email and/or short messaging service (SMS), for reminding the parties, namely end users and providers, of the immediate or scheduled real-time session or interaction.

2. The method of claim 1, further comprising the steps of:
    requesting a fee payment from the user; and
    receiving notification of the fee payment from the user.

3. The method of claim 1, further comprising the steps of:
    receiving contact information for a third party from the user;
    notifying the third party regarding the selected hour; and
    providing conference call information to the user, the provider, and the third party.

4. The method of claim 3, further comprising the steps of:
    connecting to the user at the selected hour over the internet-enabled global communications network;
    connecting to the provider at the selected hour over the internet-enabled global communications network;
    connecting to the third party at the selected hour over the internet-enabled global communications network; and
    allowing the user, the provider, and the third party to communicate.

5. The method of claim 4, further comprising the steps of:
    recording the communication between the user, the provider, and the third party; and
    storing the communication.

6. The method of claim 1, further comprising the steps of:
    connecting to the user at the selected hour over the internet-enabled global communications network;
    connecting to the provider at the selected hour over the internet-enabled global communications network; and
    allowing the user and the provider to communicate.

7. The method of claim 6, further comprising the steps of:
    recording the communication between the user and the provider; and
    storing the communication.

8. A method in a data processing system for facilitating immediate real-time language translation and interpretation services, in the event of a critical or urgent situation or event, comprising the steps of:
    receiving an end user request for translation or interpretation services over an Internet-enabled global communications network or mobile and wireless network;
    defining a data set consisting of information from the group of: native language, dialect, culture, location, gender, age, education level, availability, rating range, experience, reviews, subject matter expertise, the desired need, including but not limited to medical, business, academic, legal, and personal reasons; with said data sets aggregated and implemented into an algorithm for the end users' personalized needs, for particular events, sessions, episodes, meetings, procedures, or interactions;
    determining which of the plurality of profiles matches the requests, in order of sequence, based on the priority and metric pre-assigned value level defined as information matching said end user request consisting of the group of: languages, location, subject matter expertise, culture, gender; and that is concomitant with the data sets and criteria;
    providing a list of matching profiles to the end user;
    receiving a selection of the matching profiles for the end user(s);
    receiving a selection from a plurality of matching provider profiles predefined by the end user(s); or using fewer data sets to initiate a quick match in the event of time restrictions or an urgent need or event requiring immediate attention or care;

filtering, namely reducing the number of data sets, and curating, namely monitoring and reviewing, the plurality of provider profiles by selected end users' specific preferential and essential data sets within the plurality of provider profiles, especially if any providers update their profiles, including but not limited to locations and skill sets;

notifying the matching providers, in order of compatibility based on the desired attributes and skills, and the requested needs and the degree of urgency required to provide translation or interpretation services for said end user(s);

messaging to end user(s) alerting them of available translation and interpretation providers, based on predefined criteria, need, or situation;

selecting the provider and submitting a time and date, including time zones from a drop-down menu, for a real-time session;

confirmation by both parties, namely the end users and the providers, to participate in a real-time interaction and session; and transmission of an invite, with details and specifics, via email and/or short messaging service (SMS), for reminding the parties, namely end users and providers, of the immediate or scheduled real-time session or interaction, and;

receiving confirmation by the providers or contacts that they are available to provide services in real-time, and subsequently, will receive corresponding profiles of the subject(s) and end user(s) in need of their services, the concomitant end user or subject event, and the location wherein said services will be rendered and delivered.

9. The method of claim 8, further comprising the steps of:
requesting a fee payment from the user; and
receiving notification of the fee payment from the user.

10. The method of claim 8, further comprising the steps of:
receiving contact information for a third party from the user;
notifying the third party regarding the selected hour; and
providing conference call information to the user, the provider, and the third party.

11. The method of claim 10, further comprising the steps of:
connecting to the user at the selected hour over the global communications network;
connecting to the provider at the selected hour over the global communications network;
connecting to the third party at the selected hour over the global communications network; and
allowing the user, the provider, and the third party to communicate.

12. The method of claim 11, further comprising the steps of:
recording the communication between the user, the provider, and the third party; and
storing the communication.

13. The method of claim 8, further comprising the steps of:
connecting to the user at the selected hour over the global communications network;
connecting to the provider at the selected hour over the global communications network; and
allowing the user and the provider to communicate.

14. The method of claim 13, further comprising the steps of:
recording the communication between the user and the provider; and
storing the communication.

15. A method in a data processing system for facilitating language translation and interpretation services in real-time and in person, and submitting a location and needs request to a plurality of providers, within a database of profiles on a network, commensurate with the end user(s) requests, needs, and desired location, comprising the steps of:
receiving an end user request for translation or interpretation services over an Internet-enabled global communications network or mobile and wireless network;

defining a data set consisting of information from the group of: native language, dialect, culture, location, gender, age, education level, availability, rating range, experience, reviews, subject matter expertise, the desired need, including but not limited to medical, business, academic, legal, and personal reasons; with said data sets aggregated and implemented into an algorithm for the end users' personalized needs, for particular events, sessions, episodes, meetings, procedures, or interactions;

determining which of the plurality of profiles matches the requests, in order of sequence, based on the priority and metric pre-assigned value level defined as information matching said end user request consisting of the group of: languages, location, subject matter expertise, culture, gender; and that is concomitant with the data sets and criteria;

providing a list of matching profiles to the end user;
receiving a selection of the matching profiles for the end user(s);

receiving a selection from a plurality of matching provider profiles predefined by the end user(s); or using fewer data sets to initiate a quick match in the event of time restrictions or an urgent need or event requiring immediate attention or care;

filtering, namely reducing the number of data sets, and curating, namely monitoring and reviewing, the plurality of provider profiles by selected end users' specific preferential and essential data sets within the plurality of provider profiles, especially if any providers update their profiles, including but not limited to locations and skill sets;

notifying the matching providers, in order of compatibility based on the desired attributes and skills, and the requested needs and the degree of urgency required to provide translation or interpretation services for said end user(s);

messaging to end user(s) alerting them of available translation and interpretation providers, based on predefined criteria, need, or situation;

selecting the provider and submitting a time and date, including time zones from a drop-down menu, for a real-time session;

confirmation by both parties, namely the end users and the providers, to participate in a real-time interaction and session;

transmission of an invite, with details and specifics, via email and/or short messaging service (SMS), for reminding the parties, namely end users and providers, of the immediate or scheduled real-time session or interaction, and;

receiving confirmation by the nearby providers or contacts that they are available to provide services in real-time and in person, and subsequently, will receive corresponding profiles of the subject(s) and end user(s) in need of their services, the concomitant end user or subject event, and the location wherein said services will be rendered and delivered.

16. The method of claim 15, further comprising the steps of:
requesting a fee payment from the user; and
receiving notification of the fee payment from the user.

17. The method of claim 15, further comprising the steps of:
receiving contact information for a third party from the user; and
notifying the third party regarding the request; and
providing conference call information to the user, the provider, and the third party.

18. The method of claim 17, further comprising the steps of:
connecting to the user over the internet-enabled global communications network;
connecting to the provider over the internet-enabled global communications network;
connecting to the third party over the internet-enabled global communications network; and
allowing the user, the provider, and the third party to communicate.

19. The method of claim 18, further comprising the steps of:
recording the communication between the user, the provider, and the third party; and
storing the communication.

20. The method of claim 15, further comprising the steps of:
connecting to the user over the internet-enabled global communications network;
connecting to the provider over the internet-enabled global communications network; and
allowing the user and the provider to communicate.

21. The method of claim 20, further comprising the steps of:
recording the communication between the user and the provider; and
storing the communication.

22. The method of claim 1, further comprising the steps of:
monitoring provider availability; and
selecting the provider by one or more of category, name, geography and skill set.

23. The method of claim 8, further comprising the steps of:
monitoring provider availability; and
selecting the provider by one or more of category, name, geography and skill set.

24. The method of claim 15, further comprising the steps of:
monitoring provider availability; and
selecting the provider by one or more of category, name, geography and skill set.

25. The method of claim 1, further comprising the steps of:
selecting a list of providers based on one or more of language, dialect, age, gender, education, location, price, and cultural background; and
searching for providers having specific expertise or ratings with keywords.

26. The method of claim 8, further comprising the steps of:
selecting a list of providers based on one or more of language, age, gender, education, location, price, and cultural background; and
searching for providers having specific expertise or ratings with keywords.

27. The method of claim 15, further comprising the steps of:
selecting a list of providers based on one or more of language, age, gender, education, location, price, and cultural background; and
searching for providers having specific expertise or ratings with keywords.

* * * * *